(12) United States Patent
Zhou et al.

(10) Patent No.: US 7,757,215 B1
(45) Date of Patent: Jul. 13, 2010

(54) DYNAMIC FAULT INJECTION DURING CODE-TESTING USING A DYNAMIC TRACING FRAMEWORK

(75) Inventors: Charles Jianping Zhou, Santa Clara, CA (US); Yuguang Wu, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1115 days.

(21) Appl. No.: 11/402,348

(22) Filed: Apr. 11, 2006

(51) Int. Cl.
*G06F 9/44* (2006.01)

(52) U.S. Cl. .................... 717/124; 717/126; 717/127; 717/128; 717/129; 717/131; 717/153; 717/162; 717/163; 714/2; 714/25; 714/38

(58) Field of Classification Search ............... 717/124, 717/126, 128, 129, 130, 131, 153, 162, 163; 714/2, 25, 38, 100
See application file for complete search history.

(56) References Cited

U.S. PATENT DOCUMENTS

| | | | | | |
|---|---|---|---|---|---|
| 4,597,080 | A | * | 6/1986 | Thatte et al. | 714/726 |
| 5,226,149 | A | * | 7/1993 | Yoshida et al. | 714/25 |
| 5,526,485 | A | * | 6/1996 | Brodsky | 714/38 |
| 6,442,663 | B1 | * | 8/2002 | Sun et al. | 711/202 |
| 6,618,855 | B1 | * | 9/2003 | Lindholm et al. | 717/126 |
| 6,629,123 | B1 | * | 9/2003 | Hunt | 718/106 |
| 6,654,955 | B1 | * | 11/2003 | Kusnitz et al. | 717/163 |
| 6,839,894 | B1 | * | 1/2005 | Joshi et al. | 717/130 |
| 6,981,245 | B1 | * | 12/2005 | Schwabe | 717/126 |
| 6,996,808 | B1 | * | 2/2006 | Niewiadomski et al. | 717/130 |
| 7,159,222 | B1 | * | 1/2007 | Forin et al. | 719/310 |
| 7,231,635 | B2 | * | 6/2007 | Schwabe | 717/126 |
| 7,415,705 | B2 | * | 8/2008 | DeWitt et al. | 717/168 |
| 2002/0072830 | A1 | * | 6/2002 | Hunt | 701/1 |
| 2004/0163078 | A1 | * | 8/2004 | Correa et al. | 717/130 |
| 2005/0097515 | A1 | * | 5/2005 | Ribling | 717/124 |
| 2007/0011667 | A1 | * | 1/2007 | Subbiah et al. | 717/148 |
| 2007/0256087 | A1 | * | 11/2007 | Forin et al. | 719/332 |

OTHER PUBLICATIONS

Dynamic Code Coverage User Guide, 2004, online retrieved on Oct. 22, 2009, retrieved from Inernet URL http://www.dynamic-memory.com/DCC_User_Guide.pdf.*

(Continued)

*Primary Examiner*—Chameli C Das
(74) *Attorney, Agent, or Firm*—Martine Penilla & Gencarella, LLP

(57) ABSTRACT

An approach is provided for performing software fault injection code testing in a framework that allows testers to place flexible tracing and monitoring actions into algorithmic scripts which provide instructions for dynamically switching called software program functions to corresponding fault injected functions during program execution and that allows testers to perform fault injection testing without requiring modification or access to the underlying source code of the software program being tested. The framework suspends execution of the software program when certain conditions are met, removes any existing linking to called functions, changes the software program's runtime dynamic linking, performs any other instructions provided by the algorithmic script, and then resumes the software program's execution until execution of the program is complete or until the framework is again instructed to change the software program's runtime dynamic linking.

20 Claims, 4 Drawing Sheets

OTHER PUBLICATIONS

Title: Efficient and Flexible Architecture Support for Dynamic Monitoring, author: Yuanyuan Zhou et al, source: ACM, publication date: Mar. 2005.*

Title: iWatcher: Efficient Architectural Support for Software Debugging, author: Zhou et al, source: IEEE, publication date: 2004.*

* cited by examiner

DYNAMIC FAULT INJECTION DURING CODE-TESTING USING A DYNAMIC TRACING FRAMEWORK

BACKGROUND

1. Field of the Invention

The invention relates generally to software testing and verification, and more particularly, to a system and method for dynamic fault injection software testing and verification.

2. Description of the Related Art

Conventional software testing techniques typically test and verify software for conditions of normal operational usage. Unfortunately, these techniques do not provide software testing and verification coverage for conditions that include unexpected input events, unexpected output events, or other operational anomalies that are potentially harmful to a software system.

Fault injection techniques have been utilized to overcome some of the disadvantages of conventional software testing techniques. These software fault injection techniques generally provide a tester with the ability to inject anomalous conditions into a software system and to observe the effects that these anomalies have on the software system. However, commonly used software fault injection techniques have disadvantages that include the absence of a cost effective, comprehensive, and time efficient approach to fault injection that can be used at the integration and system testing levels, as well as at the software unit testing levels. Moreover, these commonly used software fault injection techniques are based on static implementations and therefore limit a tester's ability to dynamically adapt to testing requirements that are continually changing.

In view of the forgoing, there is a need for a dynamic software fault injection approach that can accommodate unit-level, system-level and integration-level software testing.

SUMMARY

In one embodiment, the present invention provides a system for performing fault injection software testing. The system comprises a program binary that includes a function symbol which corresponds to a function called by the program binary. The system further comprises a library that includes a fault injected version of the function called by the program binary. The system also includes a script that includes instructions for suspending the execution of the program binary when the function symbol is encountered, dynamically linking the function symbol to the fault injection version of the function included in the library, and resuming the execution of the program binary. The system further includes a dynamic trace framework that is capable of dynamically executing the program binary according to the script instructions.

In another embodiment, the present invention provides a computer-readable media for directing a computer system to perform dynamic fault injection software testing. The computer-readable media comprises instructions for executing a program binary that includes a function symbol corresponding to a function called by the program binary during execution. The computer-readable media further comprises instructions for suspending the execution of the program binary when the function symbol is encountered. The computer-readable media also comprises instructions for dynamically linking the function symbol to a fault injected version of the function included in a library. The computer-readable media further comprises instructions for resuming the execution of the program, wherein after resuming the execution of the program binary, the program binary calls the fault injected version of the function.

In yet another embodiment, the present invention provides a method for performing dynamic fault injection software testing. The method comprises obtaining a program binary, the program binary including a function symbol that corresponds to a function called by the program binary. The method further comprises generating a script that includes instructions for suspending the execution of the program binary when the function symbol is encountered, dynamically linking the function symbol to the fault injected version of the function included in the library, and resuming the execution of the program binary. The method also comprises executing the program binary according to the script instructions.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
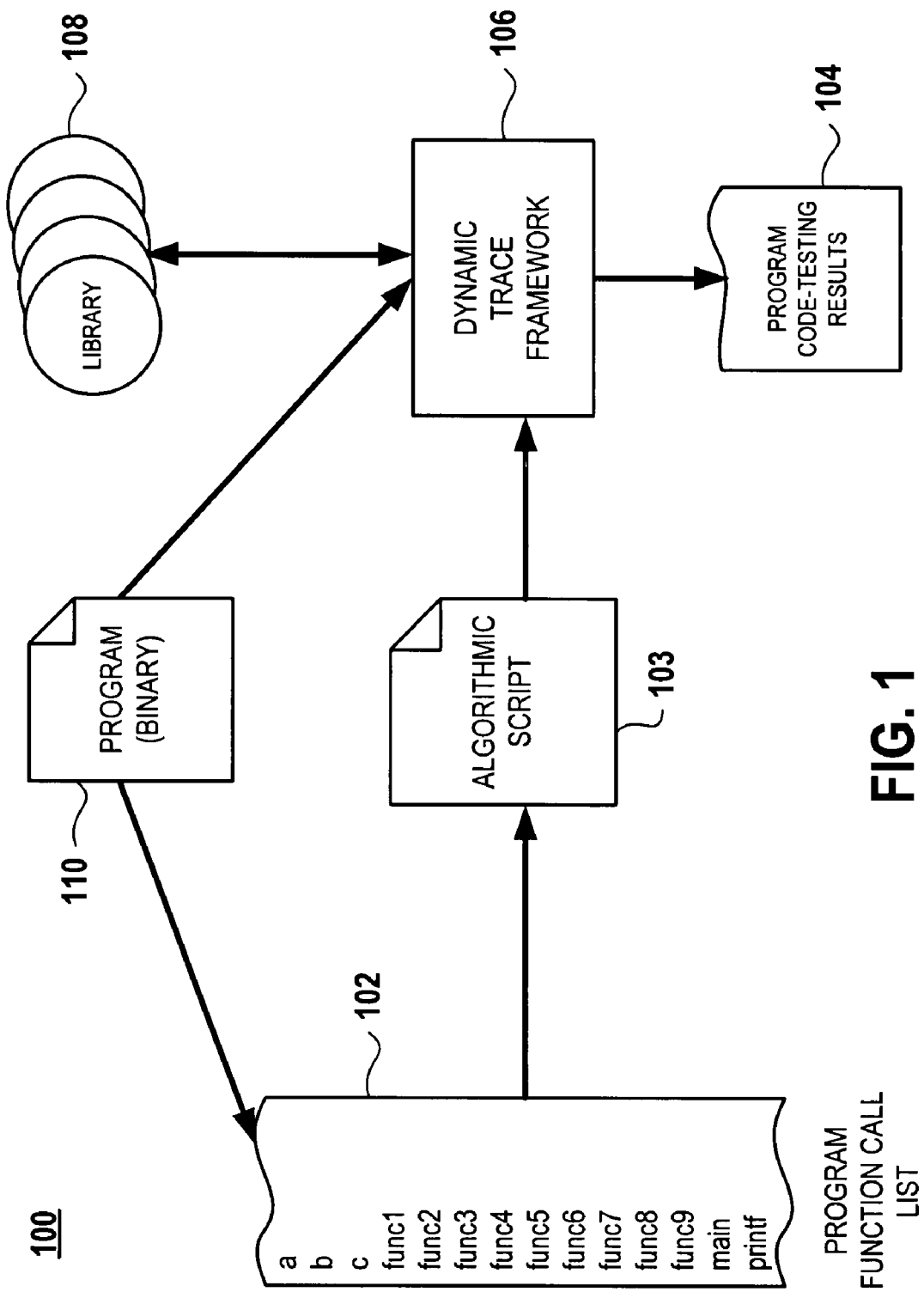
FIG. 1 is an illustration of a system for performing dynamic fault injection software testing, in accordance with an embodiment of the present invention.

Typically, during software code testing and verification, there are occasions where the ability to dynamically modify the behavior of a particular user-defined software function or module or a particular system software function called by a software program executing under testing conditions is beneficial and, most often, necessary to discover "bugs" (i.e. errors or defects in software that cause a software program to malfunction) in the software program. Embodiments of the present invention provide an approach for dynamically switching called software functions or modules with corresponding fault-injected software function or module counterparts during program execution by utilizing a dynamic software tracing and monitoring framework.

Three general implementations currently exist for conducting fault injection software code testing. In the first implementation, source code is available to the tester and, based on the tester's knowledge of the internal mechanisms of the source code, the tester can write fault-injected test code functions that are linked with the source code at compile time. However, this implementation is not desirable because the software written for the fault-injected code functions is not reusable, such software takes a significant amount of time to develop, and the source code is often not available to the tester. In the second implementation, a tester can manually include dynamic linking instructions in a software program. Specifically, the tester can explicitly call linking functions like dlopen( ) and dlclose( ) in the source code of the software program to provide switching of called function(s) or module (s) of interest. This implementation, however, is likewise undesirable because it requires access to the program source code, and it requires modifications to the program source code for purposes of incorporating the dynamic linking function calls. In the third implementation, the conventional practice is to statically replace the software functions, which are linked to user-defined libraries or system libraries, with tester-supplied functions at the beginning of the software testing process by modifying an environment variable of a software program's dynamic linking library search path, e.g. LD_LIBRARY_PATH etc. However, this conventional approach is limited since it does not provide the tester with the ability to dynamically switch a software function with a modified tester-supplied fault injected version of the same function during runtime execution of a software program. Therefore, a more flexible approach is desired that can dynamically switch called software functions or modules with fault-injected software functions or modules during program execution without requiring modification or access to the underlying source code of the software program being tested.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

In FIG. 1, in one embodiment of the present invention, is an illustration of a System 100 for providing dynamic fault injection during software code testing. The System 100 includes Program 110, Program Function Call List 102, Algorithmic Script 103, Library(s) 108, and Dynamic Trace Framework 106. In an embodiment of the present invention, Program 110 is a binary file generated from the compilation of source code that has been selected for testing. It is important to note that embodiments of the present invention are not limited to a particular binary file form and can include, for example, binary files for C/C++ compiled programs, binary files for Java compiled programs, binary files for assembly compiled programs, etc. It is also important to note that Program 110 is generated from baseline source code that does not include fault injected code. Code samples are provided in Table A below, for purposes of illustration only, to demonstrate an exemplary source code segment, corresponding to program "main" in the source code file "dt.c", that can be compiled to generate a corresponding binary file, for example "dtest.exe".

TABLE A

```
#include <stdio.h>
int func1(void);
  •
  •
  •
```

TABLE A-continued

```
void func9(void);
void a (void)
{
    printf ("func a test\n");
}
int b (void)
{
    int status = func1( );
    return status;
}
void c (void)
{
    printf (func c test\n");
}
int main ( )
{
    int i = 0;
    a( );
    b( );
    c( );
    open (fd);
    return 0;
}
```

In an embodiment of the present invention, Program Function Call List 102 is manually or dynamically generated from Program 110 binary and is a list of user-defined functions, system functions, modules, etc. called by Program 110. The Program Call List 102 allows a tester to identify those function(s) or module(s) that can be switched by the Dynamic Trace Framework 106 via the control parameters specified in the Algorithmic Script 103. For example, the list of functions called by the code sample of Table A can include a, b, c, func1, func2, func3, func4, func5, func6, func7, func8, func9, main, printf, etc. Program Function Call List 102 can be generated dynamically, for example, by calling the UNIX utility "nm" which can be used to display the contents of a binary file, e.g. "% nm –s dtest.exe | grep FUNC". However, it is important to note that embodiments of the present invention are not limited to a particular method for generating Program Function Call List 102.

In an embodiment of the present invention, the Algorithmic Script 103 is used by Dynamic Trace Framework 106 to provide the controls for the dynamic switching of functions or modules that are called during the runtime execution of Program 110. The Algorithmic Script 103 controls whether the function(s) or module(s) called during the execution of Program 110 are switched, controls what libraries, stacks, etc. the called functions or modules are switched to, controls the order the called functions or modules are switched in, and controls the conditions under which the called functions or modules are switched, etc. Generally, the Algorithmic Script 103 of embodiments of the present invention refers a program or script written in a language provided by an underlying dynamic tracing framework that dictates how the framework should control the execution (suspension, dynamic linking, resumption, etc.) of the software program under testing. For example, a code sample is provided in Table B below, for purposes of illustration only, to demonstrate an exemplary Algorithmic Script 103.

TABLE B

```
Syscall::module
/if condition matched/
{
suspend;
/* load the fault injection lib etc. */
```

TABLE B-continued

```
LD_LIBRARY_PATH=/*/   fj_lib/
resume;
}
```

The Algorithmic Script 103 illustrated in Table B is an example of a script generated in Sun Microsystems Inc™ D script language for its DTrace framework. D script is dynamic scripting language that can be used to probe data from locations of interest, collect information, or process information during execution of a software program. However, it is important to note that embodiments of the present invention are not limited to a particular scripting language or type of script. Thus, embodiments to the present invention can utilize any scripting language or program, utility etc. that is capable of providing instructions for suspending the execution of a program under testing, dynamically linking function Libraries 108 during the suspension of the program, and resuming execution of the program.

The Dynamic Trace Framework 106 executes Program 110 binary according to instructions provided by Algorithmic Script 103. Then, as discussed in more detail below in FIGS. 2 and 3, when conditions specified by the Algorithmic Script 103 are met during the execution of Program 110—for example, when a particular function call is encountered during execution—the Dynamic Trace Framework 106 can suspend the execution of Program 110, remove existing linking (if any) of certain interested function(s) or module(s), and switch Program 110's runtime dynamic linking search path etc. to various Library(s) 108. For example, the Algorithmic Script 103 can include a looping construct that directs Dynamic Trace Framework 106 to link to a different instantiation of a particular function or module during each loop iteration. In an alternate embodiment of the present invention, the Algorithmic Script 103 can instruct the Dynamic Trace Framework 106 to dynamically access the stack or call stack of Program 110 to perform various types of condition checking. For example, to detect when the depth of the call stack exceeds a very large threshold, indicating the presence of a "dead-loop." In this way, the tester can conduct comprehensive testing of a program and its associated function(s) and module(s) without requiring access to the source code of the program(s) under testing and, without the reusability issues, time investment issues, and other issues apparent in conventional fault injection testing systems.

In an embodiment of the present invention, the Library(s) 108 can include Fault Injection Libraries 108a, Operating System (OS) Libraries 108b, or any other library that includes fault injected function(s) or module(s) etc. Following any dynamic linking (i.e. switching) of function(s) or module(s), the Dynamic Trace Framework 106 can dynamically resume execution of Program 110 and the Code Testing Results 104 for Program 110 can be observed by a tester.

In embodiments of the present invention, the Dynamic Trace Framework 106 can be implemented as any module, system etc. that is capable of dynamically modifying and tracing software processes etc. to examine and collect information about the behavior of software programs etc. during execution. An advantage of utilizing the Dynamic Trace Framework 106 is that function and module calls can be dynamically traced in the background without user intervention and when a function call or module call of interest is encountered during program execution, the Dynamic Trace Framework 106 can suspend execution of any Program 110, take a particular action—for example, dynamically linking the Program 110 to libraries that include fault injected functions and modules; resume execution of Program 110; and provide testing results and metrics to the tester.

Figure 2A:
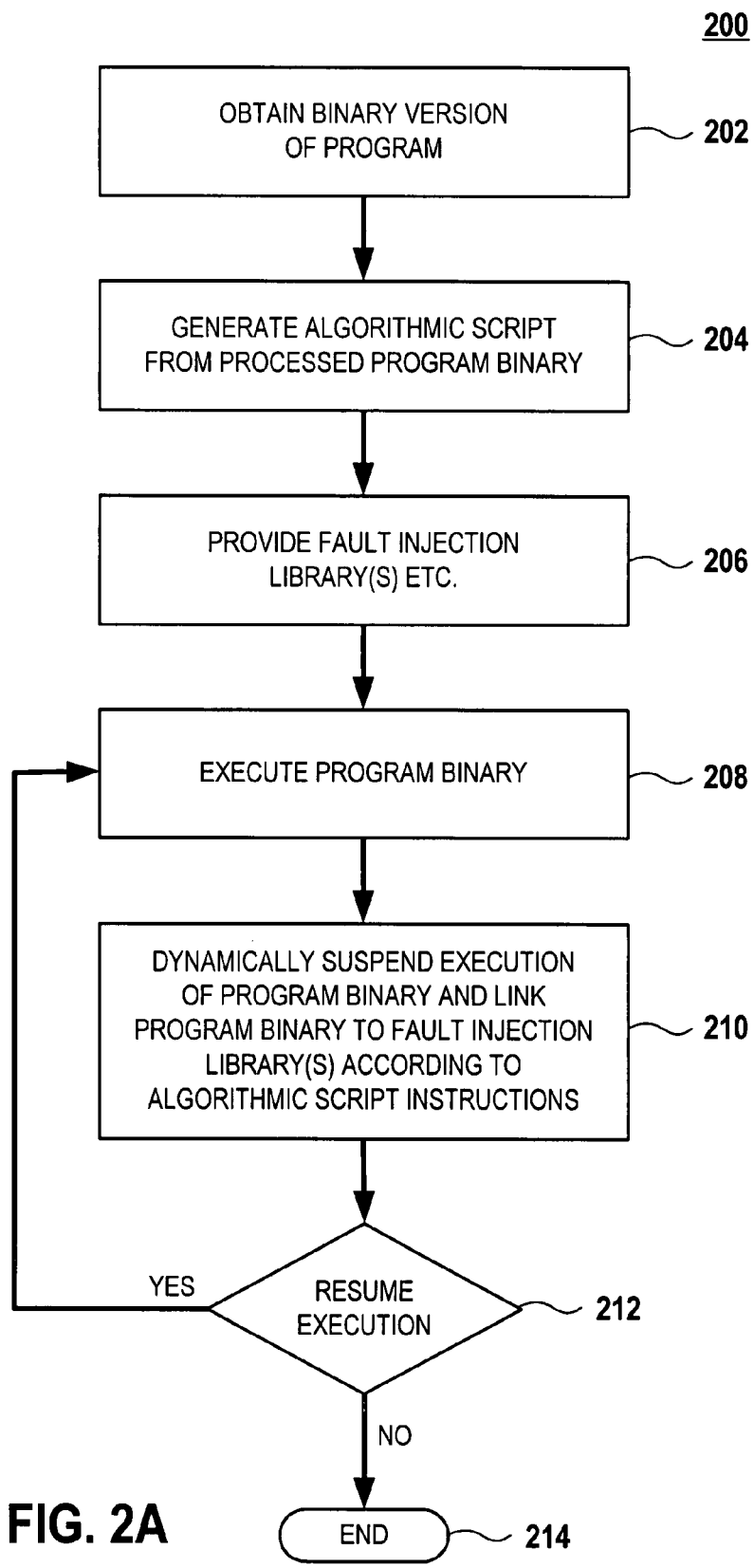
FIG. 2A is an illustration of a method for performing dynamic fault injection software testing, in accordance with an embodiment of the present invention.

In FIG. 2A, a flowchart showing a method 200 for dynamically linking fault injection libraries or other system libraries etc. in accordance with one embodiment of the present invention is illustrated. At step 202, in an embodiment of the present invention, a Program 110 binary is obtained. It is important to note that, unlike conventional fault injection systems, embodiments of the present invention allow a tester to perform fault injection testing without having access to the source code corresponding to Program 110, and without having to modify the source code that is being tested.

At step 204, in an embodiment of the present invention, the Algorithmic Script 103 can be generated manually, or dynamically using a script tool. The Algorithmic Script 103 can be implemented in any scripting language or any other programming language etc. that is capable of providing dynamic tracking, monitoring and linking instructions to a Dynamic Trace Framework 106. The Algorithmic Script 103 can include instructions for dynamically linking etc. fault injected versions of the function(s) or module(s) etc. that are identified in the Program Function Call List 102. The Algorithmic Script 103 can also include logic for when a function or module is called, the order in which the function or module is called, etc. As previously discussed, the Program Function Call List 102 is generated by processing the content of the binary Program 110 to obtain a list of all of the function(s) or module(s) called by Program 110 during runtime execution.

At step 206, in an embodiment of the present invention, the Fault Injection Library 108s can be customized library generated to include fault injected versions of the user-defined function(s) or module(s) called by Program 110, and identified in the Program Function Call List 102. During the execution of Program 110, as discussed in detail below, the Dynamic Trace Framework 106 can dynamically link to various user-defined function(s) or module(s) of the Fault Injection Library 108a or to OS-defined functions of a System Library 108b. The fault injected function(s) or modules of the Fault Injection Library 108a can be customized error injected software written with or without the tester's knowledge of the internal mechanisms of the Program 110 source code and stored in the Fault Injection Library 108a. In an embodiment of the present invention, the fault injected software for standard Operating System (OS)-defined function or module calls is typically defined by the OS (operating system) being used and is stored in the System Library 108b (for example, "libc") without the tester having to take any additional action. For example, utilization of the Library(s) 108 can allow a tester to test software modules at their interfaces to determine how a software module will respond to an error returned from a call to an error-injected function; to test software modules internally by utilizing error-injected functions to inject anomalous conditions into the internal mechanisms of a software module; to test software modules by causing a fault injected function to dump a current call stack to display the stack trace; etc. In other words, embodiments of the present invention allow a tester to utilize dynamically linked fault-injected functions of Library(s) 108 to perform any type of testing necessary to provide comprehensive testing of a software system, irrespective of the tester's access to or knowledge of the details of the underlying source code of the software system. As such, it is important to note that the embodiments of the present invention are not limited to a particular quantity or type of Library(s) 108 that can be linked by the Dynamic Trace Framework 106.

At step 208, in an embodiment of the present invention, the binary version of Program 110 is executed within the Dynamic Trace Framework 106 according to instructions dynamically provided to the Dynamic Trace Framework 106 by the Algorithmic Script 103.

Figure 2B:
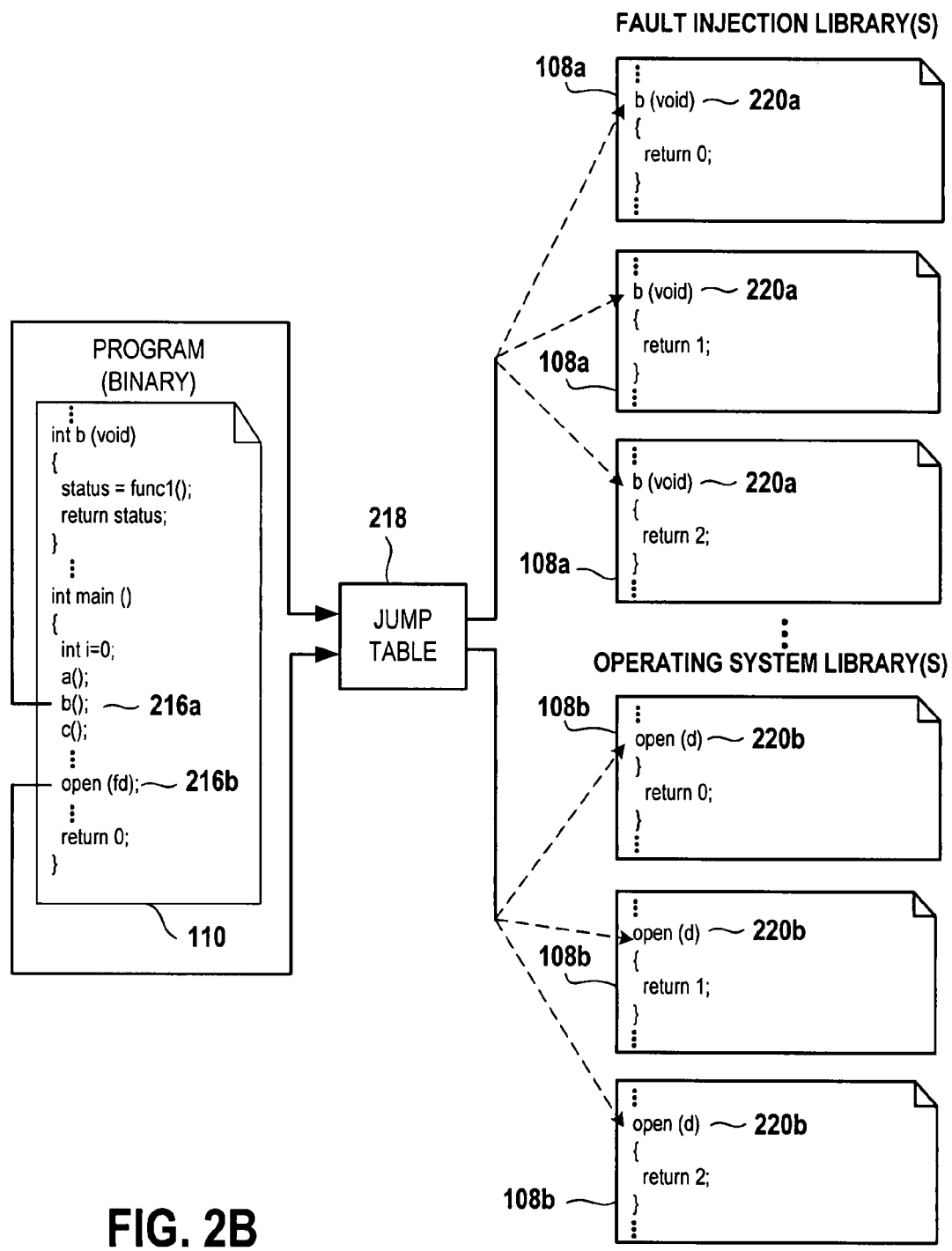
FIG. 2B is an illustration of a method for dynamically linking fault injection libraries, in accordance with an embodiment of the present invention.

At step 210, when during execution of Program 110 the Dynamic Trace Framework 106 encounters a function or module of interest identified in the Program Function Call List 102, the Dynamic Trace Framework 106 suspends the execution of Program 110 and removes any existing linking to the function or module of interest and changes the runtime dynamic linking search path for Program 110 to include selected Library(s) 108 according to instructions provided in the Algorithmic Script 103, as shown in FIG. 2B.

As illustrated in FIG. 2B, in an embodiment of the present invention, the dynamic linking provided by the Dynamic Trace Framework 106 allows the capability to dynamically bind or unbind function symbols during program execution. Specifically, in an embodiment of the present invention, the Calls 216 to a particular function included in Program 110 correspond to a unique function symbol that can be found in one or more Library(s) 108. Each library function Call 216 goes through a Jump Table 218 which initially points to a Dynamic Linker Runtime Start-up Code (not shown) that loads required libraries and binds called function symbols at runtime. When an unbound function symbol is called, the dynamic linking runtime start-up code will search for the function symbol from an ordered list of Libraries 108 and, when found, the runtime start-up code loads the Library 108 in memory (if not already in memory) and binds the function symbol with the correct function reference—in other words, the Jump Table 218 entry for a particular function call 216 is updated to point at a corresponding library function 220 that is contained in a Library 108.

Following the performance of the dynamic linking, the Dynamic Trace Framework 106 then resumes the processing of Program 110, as described in step 212 below. For subsequent function or module calls, the only overhead is the indirect reference (extra function jump) to the called function. In an embodiment of the present invention, the order of the library search can be governed by a number of changeable parameters, such as the environment variable LD_LIBRARY_PATH, and the search path commonly referred to as "runpath" in the dynamic section of an ELF (executable and linking format) file etc. However, it is important to note that embodiments of the present invention are not limited to any particular approach for performing a library search etc.

In view of the discussion above, it should be apparent that embodiments of the present invention provide the capability to exploit dynamic linking capabilities to bind or unbind function symbols for the purpose of providing "on-the-fly" dynamic algorithmic error injection. In other words, by selectively erasing an existing function-binding or module-binding (and also releasing associated private data segments, if any) from a software program that is being monitored for testing purposes, by altering the software program's library search path order, and by allowing the runtime dynamic linking to re-bind the affected function symbol to a different library function, embodiments of the present invention provide "on-the-fly" dynamic algorithmic error injection. The unbinding approach of an embodiment of the present invention can include reverting a Jump Table 218 to point back to the universal start-up code of the runtime dynamic linking. This implementation can be accomplished, for example, by utilizing a "privileged" (i.e. access controlled) utility tool that can unbind the function symbol or modify the library search path of the Program 110. The method 200 continues at step 212.

Referring again to FIG. 2A, at step 212, after any necessary dynamic linking is performed, the execution of Program 110 is dynamically resumed at step 208 and the tester is able to observe the manner in which Program 110 handles the errors injected by dynamically linking function or module calls in Program 110 to corresponding fault injected function(s) or module(s) in Libraries 108. Steps 208 to 212 are repeated until the execution of Program 110 automatically terminates in step 214 or is voluntarily terminated in step 214.

Figure 3A:
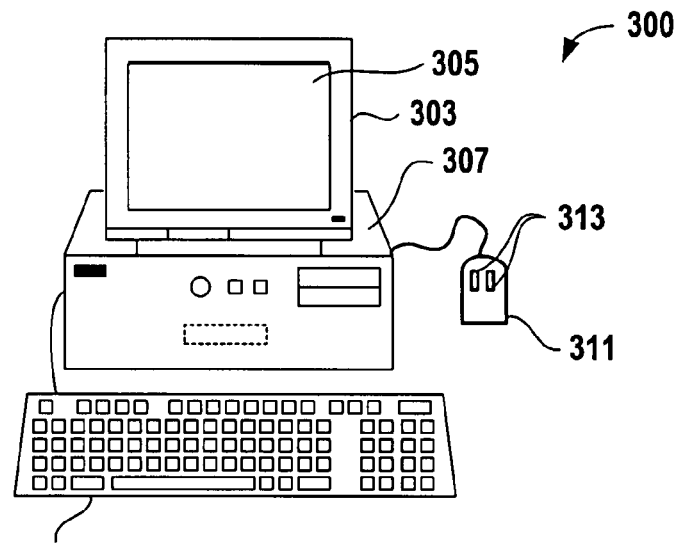
FIG. 3A is a generalized diagram of a typical computer system suitable for use with the present invention.

In FIG. 3A, is an illustration of an embodiment of an exemplary computer system 300 suitable for use with the present invention including display 303 having display screen 305. Cabinet 307 houses standard computer components (not shown) such as a disk drive, CDROM drive, display adapter, network card, random access memory (RAM), central processing unit (CPU), and other components, subsystems and devices. User input devices such as a mouse 311 having buttons 313, and keyboard 309 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 3B:
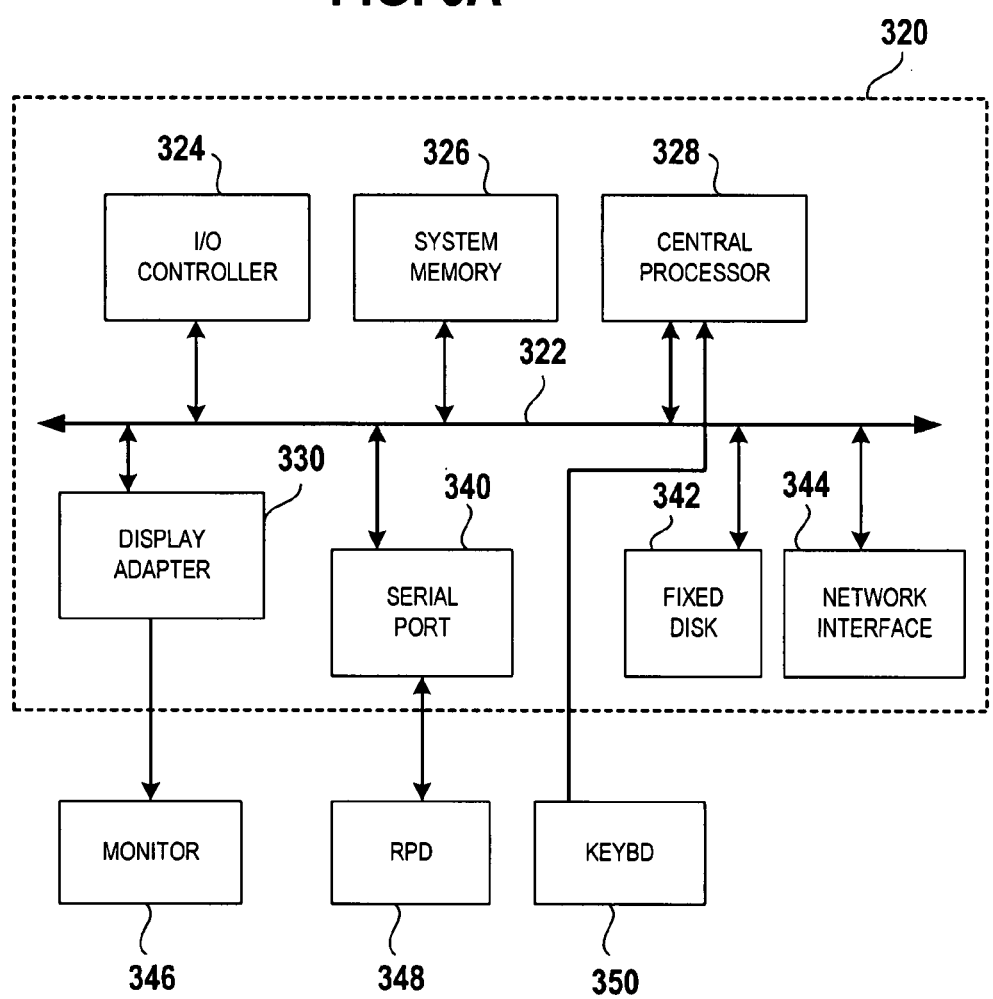
FIG. 3B shows subsystems in the typical computer system of FIG. 3A.

FIG. 3B illustrates subsystems that might typically be found in a computer such as computer 300. In FIG. 3B, subsystems within box 320 are directly interfaced to internal bus 322. Such subsystems typically are contained within the computer system such as within cabinet 307 of FIG. 3A. Subsystems include input/output (I/O) controller 324, System Random Access Memory 9RAM) 326, Central Processing Unit (CPU) 328, Display Adapter 330, Serial Port 340, Fixed Disk 342 and Network Interface Adapter 344. The use of bus 322 allows each of the subsystems to transfer data among the subsystems and, most importantly, with the CPU. External devices can communicate with the CPU or other subsystems via the bus 322 by interfacing with a subsystem on the bus. Monitor 346 connects to the bus through Display Adapter 330. A relative pointing device (RPD) 348 such as a mouse connects through Serial Port 340. Some devices such as a Keyboard 350 can communicate with the CPU by direct means without using the main data bus as, for example, via an interrupt controller and associated registers (not shown).

As with the external physical configuration shown in FIG. 3A, many subsystem configurations are possible. FIG. 3B is illustrative of but one suitable configuration. Subsystems, components or devices other than those shown in FIG. 3B can be added. A suitable computer system can be achieved without using all of the subsystems shown in FIG. 3B. For example, a standalone computer need not be coupled to a network so Network Interface 344 would not be required. Other subsystems such as a CDROM drive, graphics accelerator, etc. can be included in the configuration without affecting the performance of the system of the present invention.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of embodiments of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/0) device, the computer would have suitable instructions for allowing a user to input or output (e.g., present) program code and/or data information respectively in accordance with the embodiments of the present invention.

A 'computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for performing dynamic fault injection software testing, comprising:
    a program binary, the program binary including a function symbol, wherein the function symbol corresponds to a function called by the program binary;
    a library, the library including a fault injected version of the function;
    a script, the script including instructions for suspending the execution of the program binary when the function symbol is encountered, dynamically linking the function symbol to the fault injected version of the function included in the library, wherein the dynamic linking includes dynamically switching the function with the fault injected version of the function during the execution of the program binary without requiring modification or access to underlying source code of the function, and resuming the execution of the program binary; and
    a dynamic trace framework, the dynamic trace framework configured to dynamically execute the program binary according to the script instructions with the fault injected version of the function.

2. The system as recited in claim 1, further comprising a jump table, wherein an entry of the jump table corresponds to the function symbol.

3. The system as recited in claim 2, wherein instructions for dynamically linking the function symbol to the fault injected version of the function include updating the entry of the jump table to bind the function symbol to the fault injected version of the function.

4. The system as recited in claim 1, wherein the function is an operating system (OS) function.

5. The system as recited in claim 1, wherein the function is a user-defined fault injected function.

6. The system as recited in claim 1, wherein the library is an operating system (OS) library.

7. The system as recited in claim 1, wherein the library is a customized fault injection library.

8. The system as recited in claim 1, wherein the script is an algorithmic script that controls a manner in which the dynamic trace framework executes the program binary.

9. The system as recited in claim 1, wherein dynamically linking the function symbol to the fault injected version of the function is performed without modification to source code compiled to generate the program binary.

10. The system as recited in claim 1, wherein dynamically executing the program binary is performed without user intervention.

11. The system as recited in claim 1, wherein dynamic executing the program binary is performed as a background process.

12. A method for performing dynamic fault injection software testing, the method comprising:
   obtaining a program binary, the program binary including a function symbol, wherein the function symbol corresponds to a function called by the program binary;
   generating a script, wherein the script includes instructions for suspending the execution of the program binary when the function symbol is encountered, dynamically linking the function symbol to a fault injected version of the function included in the library wherein the dynamic linking includes dynamically switching the function with the fault injected version of the function during the execution of the program binary without requiring modification or access to underlying source code of the function, and resuming the execution of the program binary; and
   executing the program binary according to the script instructions with the fault injected version of the function.

13. The method as recited in claim 12, wherein the instructions for dynamically linking the function symbol to the fault injected version of the function includes updating an entry of a jump table to bind the function symbol to the fault injected version of the function.

14. The method as recited in claim 12, wherein the function is an operating system (OS) function.

15. The method as recited in claim 12, wherein the function is a user-defined function.

16. The method as recited in claim 12, wherein the library is an operating system (OS) library.

17. The method as recited in claim 12, wherein the library is a customized fault injection library.

18. The method as recited in claim 12, wherein the script is an algorithmic script.

19. The method as recited in claim 12, wherein dynamically linking the function symbol to the fault injected version of the function is performed without modification to source code compiled to generate the program binary.

20. A computer-readable storage media having programming instructions which when executed by a processor of a computer system enables directing the computer system to perform dynamic fault injection software testing, the computer-readable storage media comprising:
   instruction for executing a program binary, the program binary including a function symbol corresponding to a function called by the program binary during execution;
   instructions for suspending the execution of the program binary when the function symbol is encountered;
   instructions for dynamically linking the function symbol to a fault injected version of the function included in a library, wherein the instructions for dynamically linking includes instructions for dynamically switching the function with the fault injected version of the function during execution of the program binary without requiring modification or access to underlying source code of the function; and
   instructions for resuming the execution of the program binary with the fault injected version of the function, wherein after resuming the execution of the program binary, the program binary calls the fault injected version of the function.

* * * * *